Feb. 6, 1940.  F. E. FLADER  2,189,201
GUSSETED FITTING
Filed Aug. 17, 1937
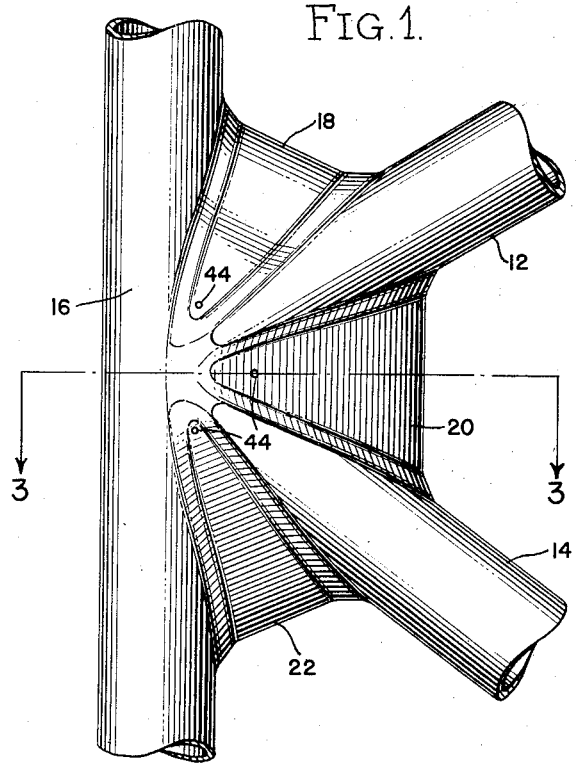
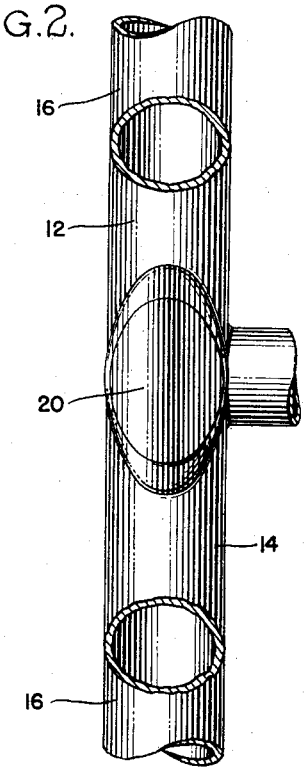
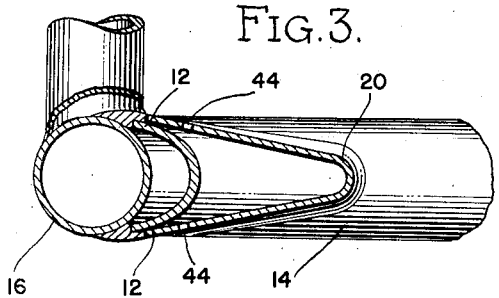
INVENTOR
FREDRIC E. FLADER.
BY
ATTORNEY Patented Feb. 6, 1940

2,189,201

UNITED STATES PATENT OFFICE 2,189,201

GUSSETED FITTING

Fredric E. Flader, Kenmore, N. Y., assignor to Curtiss-Wright Corporation, a corporation of Delaware Application August 17, 1937, Serial No. 159,459

2 Claims. (Cl. 287—54)

This invention relates to structural joints and especially to an improved method and means of joining structural shapes by employing a special form of gusset in a welded joint.

In previous practice it has been customary to obtain additional strength, in a welded joint composed of tubular members meeting at an angle, by employing a corner gusset plate (or plates) welded into the junction of the members with its plane substantially in the plane joining the axial lines of the said tubular members and such gusset plates have usually been triangular pieces of flat metal. With a gusset of this previous type however it is necessary that the joint be heated to welding temperature twice; once for one side of the gusset and again for the opposite side and, as is well known, such excessive heating has the direct effect of weakening the joint. Not only is the use of relatively thin plates as gussets undesirable from the above standpoint but in addition there is a poor distribution in the transfer of load from one member to the other which consequently further reduces the overall joint strength.

In view of the above mentioned defects in welded tubular joints it is a principal object of this invention to provide a gusset joint that will not necessarily be subjected to excessive heating during the welding process and which will therefore have a greater overall strength than comparable joints produced as previously described. It is a further object to provide a type of gusset which will serve to more favorably distribute the load and the welded portion over a greater area of the joint without substantially increasing the total linear dimension of the weld. These and other objects will become apparent during the course of the following description.

In the drawing:

Fig. 1 illustrates a welded joint employing gussets according to this invention, Fig. 2 shows a plan view of the same joint, and Fig. 3 shows a cross sectional view taken along the lines 3—3 of Fig. 1.

The improved method of this invention provides for the use of V-shaped, or double-walled gusset plates 18, 20 and 22, in place of the flat triangular gussets used in the joint of prior constructions. In preparing the strut ends of the intersecting members 12 and 14 it will be noted from Figs. 1 and 2 that they are cut to provide for their being welded to the V-shaped gussets along the curved intersections beginning on the tube surfaces at the plane of the axes of the tubes and extending in both directions along the sides of a V following the contact surfaces of intersection with the V-shaped gussets. The weld therefore terminates at a common intersection at the diverging ends of the gussets at the outer surfaces of the joint instead of each terminating individually, as heretofore.

The improved V-shaped gusset plates 18, 20 and 22 may be previously cut and bent to shape from a flat sheet which may be of the same or lesser thickness than the flat gussets previously described, and are formed to a curved shape resembling a V with a rounded vertex portion according to the requirements of the particular joint in which they are used. In assembling a joint of this type the strut members are suitably held in a jig in the usual manner and the gussets are then fitted into their corresponding positions and either tack-welded or otherwise suitably held in place prior to their being permanently welded into the integral structure of the joint. The V-shaped gussets 18, 20, and 22 may be provided with vent holes as indicated at 44 to facilitate the escape of gases and thereby relieve any pressures which may tend to form within the joint structure due to expansion caused by the heat of welding. These holes may later be sealed by welding or other suitable method, preferably when the assembly has cooled sufficiently to prevent unnecessary stressing of the joint.

It will be noted from the above description that in the joint shown in Fig. 1 it is not necessary to heat any surface on both sides, thereby preventing overheating and damage to the joint structure. The joint of this invention further improves over methods heretofore used in that the stresses are distributed over greater areas of the tube walls instead of concentrated along a single central plane as heretofore. The V-shaped gussets also make for a neat appearance, an intersecting joint which is more readily painted, or kept clean, and in which moving parts such as control cables and so forth are less likely to chafe or become fouled.

Having thus described my invention in detail in a preferred embodiment, it will nevertheless be obvious to those skilled in the art, that various changes and modifications may be made therein without departing from the spirit thereof and I aim to include all such modifications and changes within the scope of the appended claims.

I claim:

1. In a welded joint construction, a plurality of intersecting members, a gusset formed from a substantially diamond-shaped plate bent along its width such that its acute ends are substantially codirectional and spatially separated by the thickness of the intersecting members, and a continuous line of weld metal around the periphery of said gusset joining the same to the adjacent joint members.

2. In a welded joint construction, a plurality of intersecting members, a gusset formed from a single plate bent upon itself about one of its diagonals whereby the resulting double walls approach juxtaposition but remain spaced such that their peripheral edges only are in touching relationship with the adjacent members and a continuous line of welded metal throughout the extent of the said peripheral edges, the said bend forming a straight edge opposite to and remote from the intersecting vertex of said adjacent members.

FREDRIC E. FLADER.